(12) United States Patent
Lee et al.

(10) Patent No.: US 10,917,508 B2
(45) Date of Patent: Feb. 9, 2021

(54) MOBILE TERMINAL THAT SWITCHES AUDIO PATHS BASED ON DETECTED MOVEMENT OF THE TERMINAL

(71) Applicant: LG ELECTRONICS INC., Seoul (KR)

(72) Inventors: Dongeon Lee, Seoul (KR); Haelie Kwak, Seoul (KR); Seonghyok Kim, Seoul (KR); Sungzoon Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 492 days.

(21) Appl. No.: 14/717,929

(22) Filed: May 20, 2015

(65) Prior Publication Data
US 2015/0341482 A1     Nov. 26, 2015

(30) Foreign Application Priority Data

May 23, 2014    (KR) .......................... 10-2014-0062536

(51) Int. Cl.
*H04M 1/725* (2006.01)
*H04M 1/60* (2006.01)
(Continued)

(52) U.S. Cl.
CPC ........ *H04M 1/6066* (2013.01); *G06F 1/1694* (2013.01); *G06F 3/017* (2013.01);
(Continued)

(58) Field of Classification Search
CPC .. H04M 1/605; H04M 1/6041; H04M 1/6066; H04M 1/6091; H04M 1/72519;
(Continued)

(56) References Cited

U.S. PATENT DOCUMENTS

| | | | |
|---|---|---|---|
| 8,706,162 B1 * | 4/2014 | Abrahamsson | H04M 1/605 455/556.1 |
| 2006/0030360 A1 | 2/2006 | Yeh | |

(Continued)

FOREIGN PATENT DOCUMENTS

| | | |
|---|---|---|
| CN | 1325250 | 12/2001 |
| CN | 101741978 | 6/2010 |

(Continued)

OTHER PUBLICATIONS

European Patent Office Application Serial No. 15001539.4, Search Report dated Oct. 19, 2015, 7 pages.

(Continued)

*Primary Examiner* — Lester G Kincaid
*Assistant Examiner* — Dung L Lam
(74) *Attorney, Agent, or Firm* — Lee Hong Degerman Kang & Waimey

(57) ABSTRACT

The present invention relates to a mobile terminal capable of efficiently controlling reception of an incoming call in a state that an external terminal capable of assisting audio output is connected with the mobile terminal and a method of controlling therefor. Specifically, the present invention relates to the mobile terminal including a wireless communication unit configured to communicate with the external terminal, a sensing unit configured to detect a movement of the mobile terminal, an audio output unit and a controller, if a first movement is detected by the sensing unit in the middle of receiving the incoming call in a first configuration state of which an audio output is performed via a first external terminal, configured to accept the incoming call and switch to a second configuration outputting an calling signal for the accepted incoming call via the audio output unit instead of the first external terminal.

14 Claims, 15 Drawing Sheets

(51) Int. Cl.
*G06F 3/01* (2006.01)
*G06F 3/041* (2006.01)
*G06F 1/16* (2006.01)

(52) U.S. Cl.
CPC ........ *G06F 3/041* (2013.01); *H04M 1/72519* (2013.01); *H04M 1/72569* (2013.01); *G06F 2200/1637* (2013.01); *H04M 1/6091* (2013.01); *H04M 1/7253* (2013.01); *H04M 1/72558* (2013.01); *H04M 1/72597* (2013.01); *H04M 2250/12* (2013.01)

(58) Field of Classification Search
CPC ........... H04M 1/7253; H04M 1/72558; H04M 1/72569; H04M 1/72597; H04M 2250/12; G06F 2200/1637; G06F 1/1694; G06F 3/017; G06F 3/041; H04W 8/22
See application file for complete search history.

(56) References Cited

U.S. PATENT DOCUMENTS

| | | | |
|---|---|---|---|
| 2008/0113688 A1 | 5/2008 | Lee et al. | |
| 2008/0140868 A1 | 6/2008 | Kalayjian et al. | |
| 2009/0209293 A1* | 8/2009 | Louch | H04M 1/6041 455/566 |
| 2009/0274317 A1 | 11/2009 | Kahn et al. | |
| 2010/0124947 A1* | 5/2010 | Sano | H04M 1/6058 455/567 |
| 2011/0304648 A1* | 12/2011 | Kim | G06F 1/1626 345/633 |
| 2012/0244812 A1* | 9/2012 | Rosener | H04M 1/05 455/41.3 |
| 2013/0315108 A1* | 11/2013 | Lindner | H04W 4/08 370/277 |
| 2014/0128063 A1* | 5/2014 | Chhabra | H04W 76/14 455/435.1 |
| 2014/0235290 A1* | 8/2014 | Cho | H04M 1/6058 455/550.1 |
| 2014/0310643 A1* | 10/2014 | Karmanenko | H04M 1/0202 715/784 |

FOREIGN PATENT DOCUMENTS

| | | |
|---|---|---|
| CN | 101751958 | 6/2010 |
| CN | 102821203 | 12/2012 |
| CN | 103533170 | 1/2014 |
| EP | 2187604 | 5/2010 |
| EP | 2768209 | 8/2014 |

OTHER PUBLICATIONS

European Patent Office Application Serial No. 18168115.6, Search Report dated Nov. 7, 2018, 13 pages.

Chinese application No. 201510266549.X, Office Action dated Jul. 29, 2019, 11 pages.

* cited by examiner

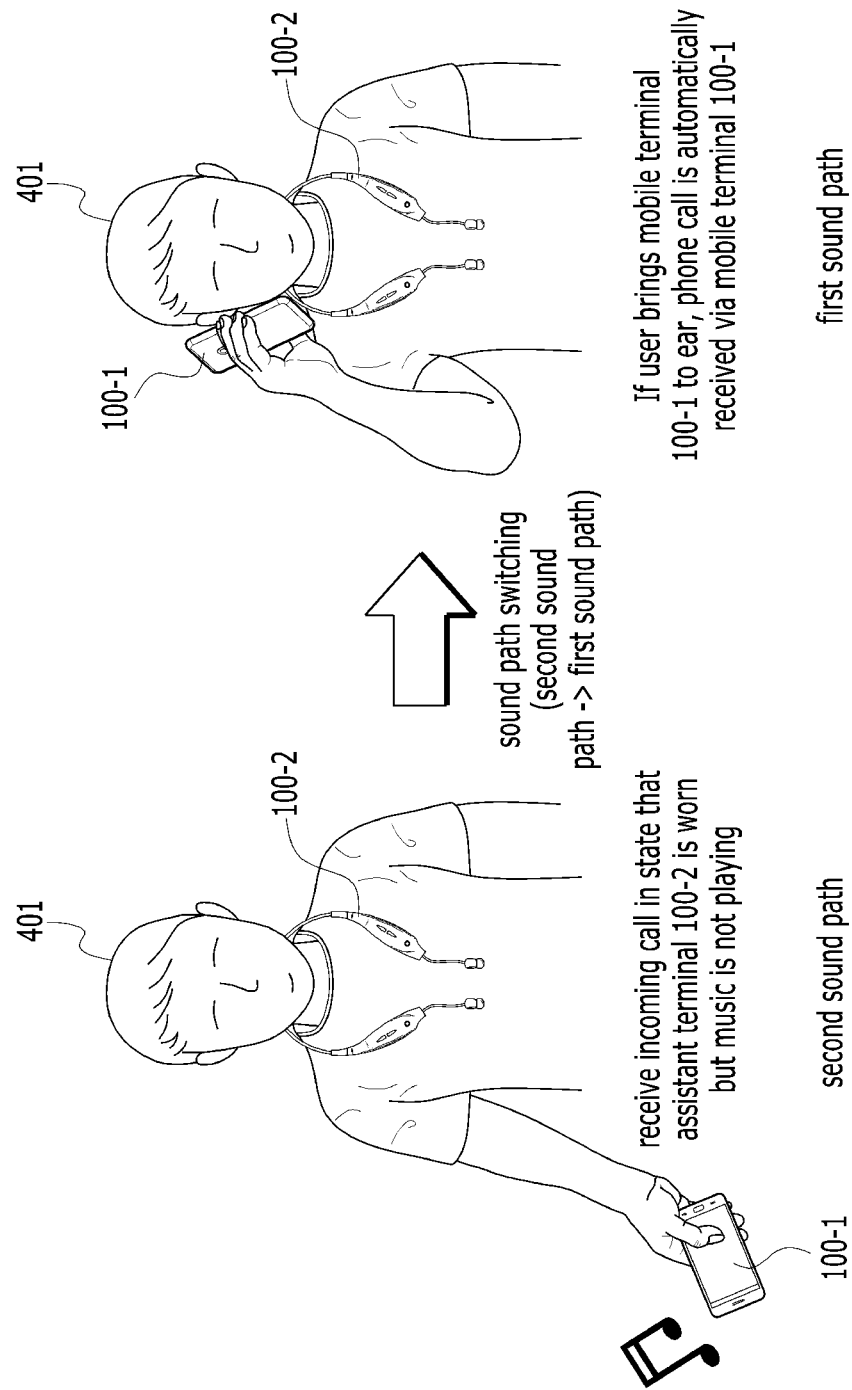

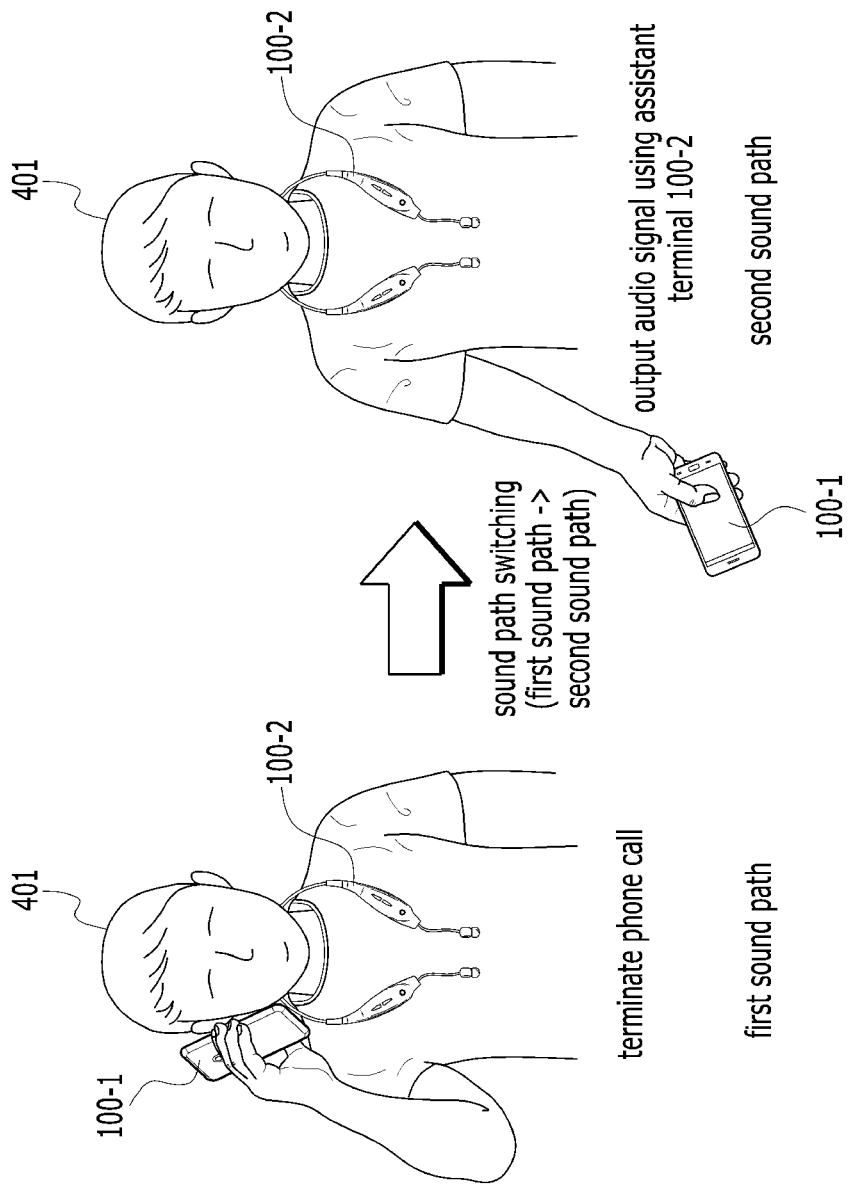

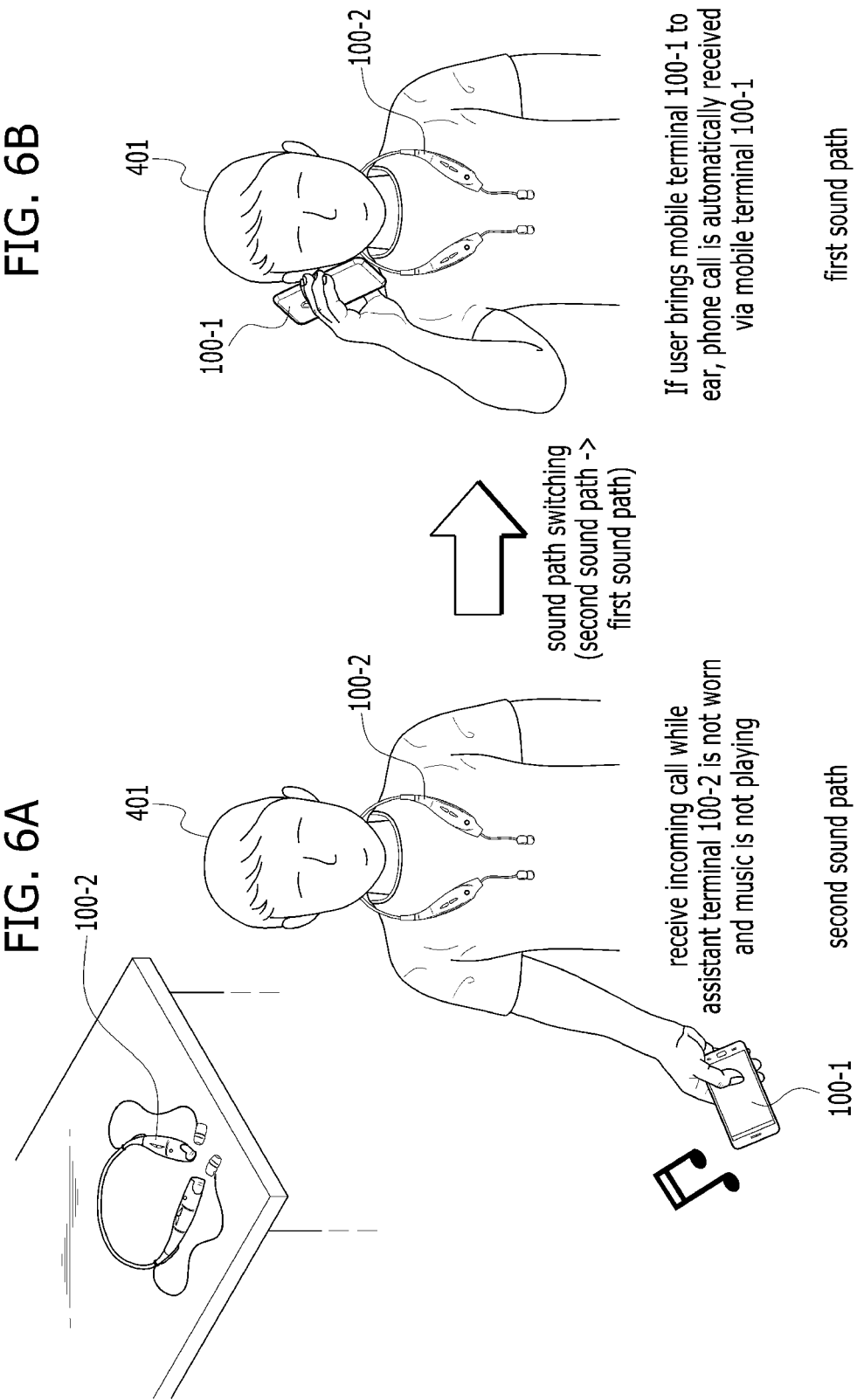

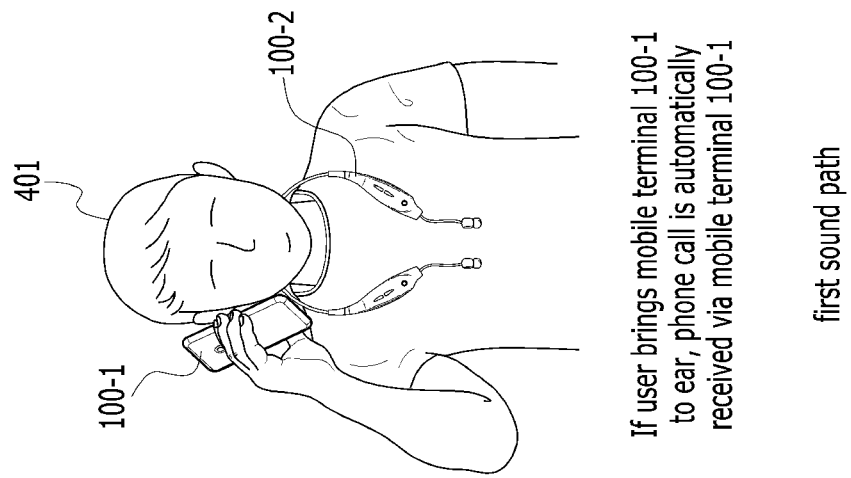
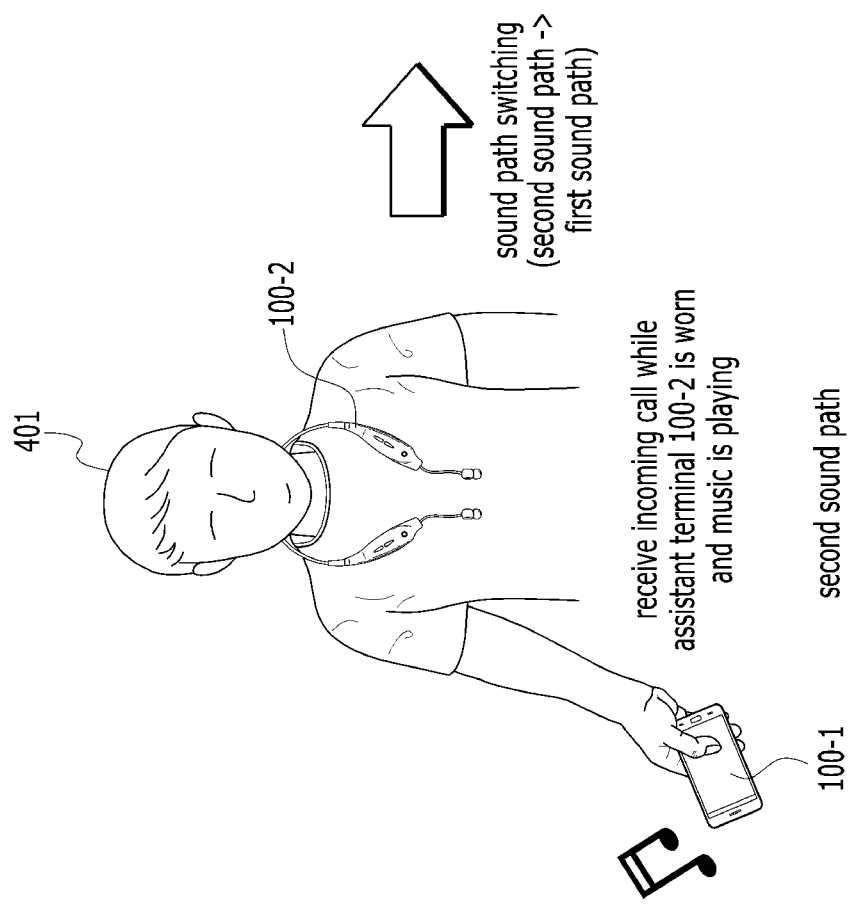

If user brings mobile terminal 100-1 to ear, phone call is automatically received via mobile terminal 100-1 first sound path sound path switching
(third sound path ->
first sound path)

receive incoming call while first assistant terminal 100-2 is worn and second assistant terminal 100-3 is connected third sound path receive incoming call while first assistant terminal 100-2 is worn and second assistant terminal 100-3 is connected third sound path If user wears earphone 202, phone call is automatically received via assistant terminal 100-2 second sound path sound path switching (third sound path -> second sound path)

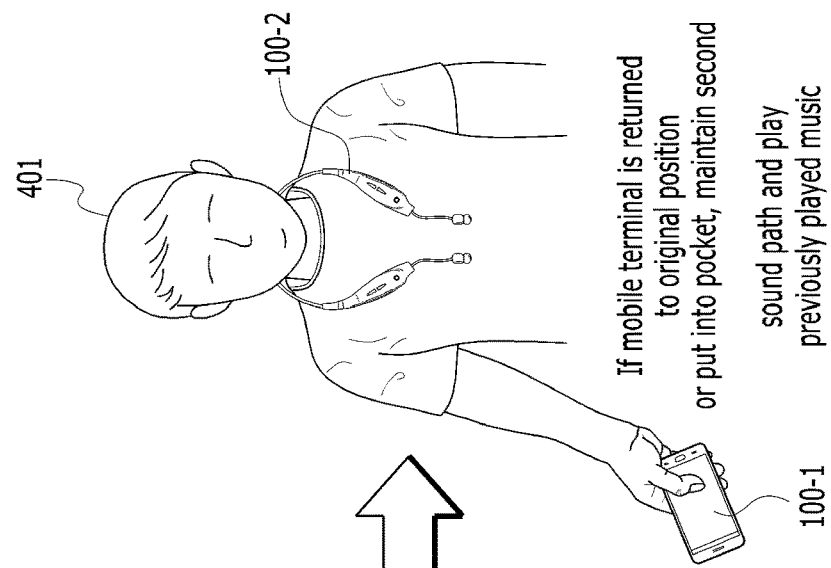
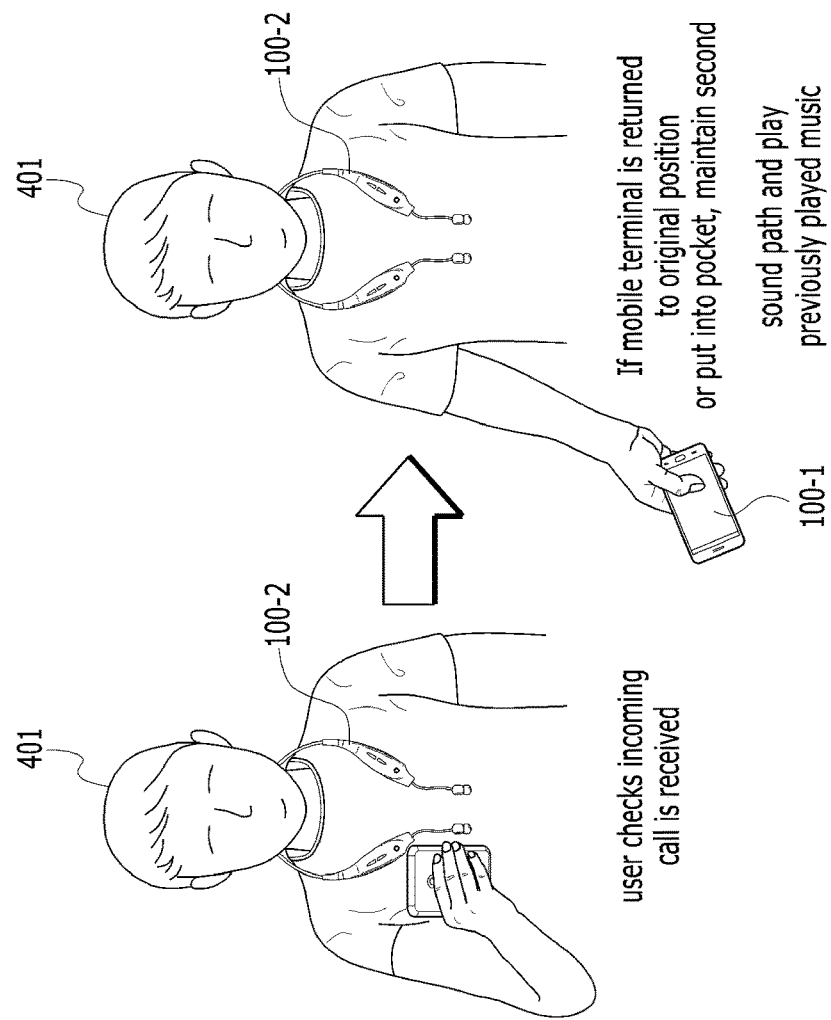
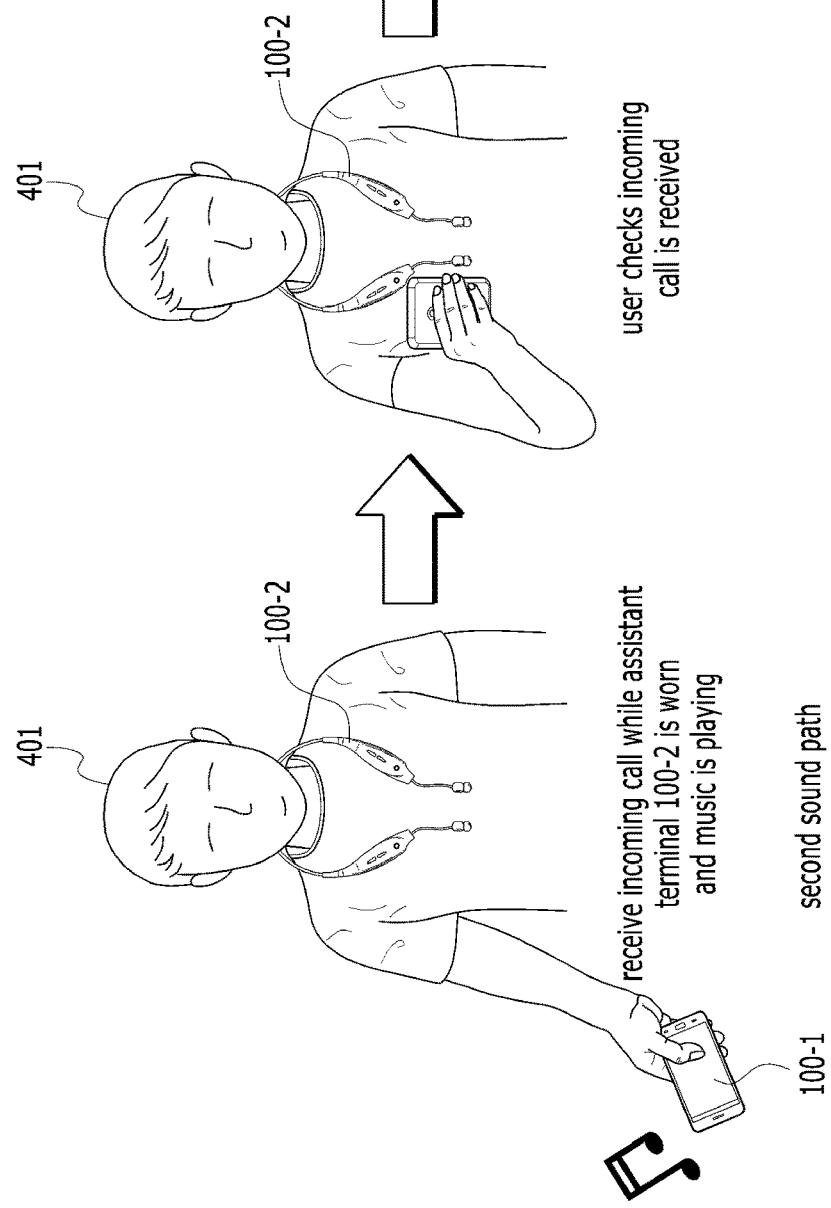

In the middle of making call using mobile terminal 100-1 first sound path vibration or sound mobile terminal is put on flat floor first sound path continuously making call using assistant terminal 100-2 second sound path

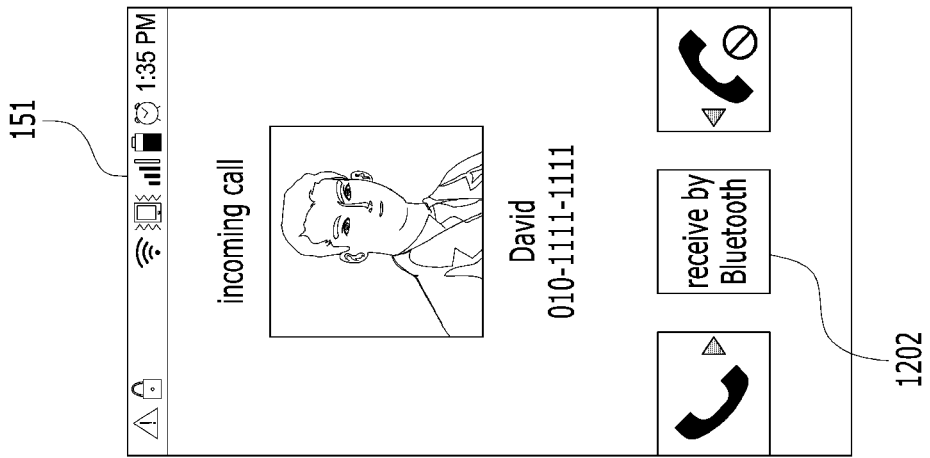
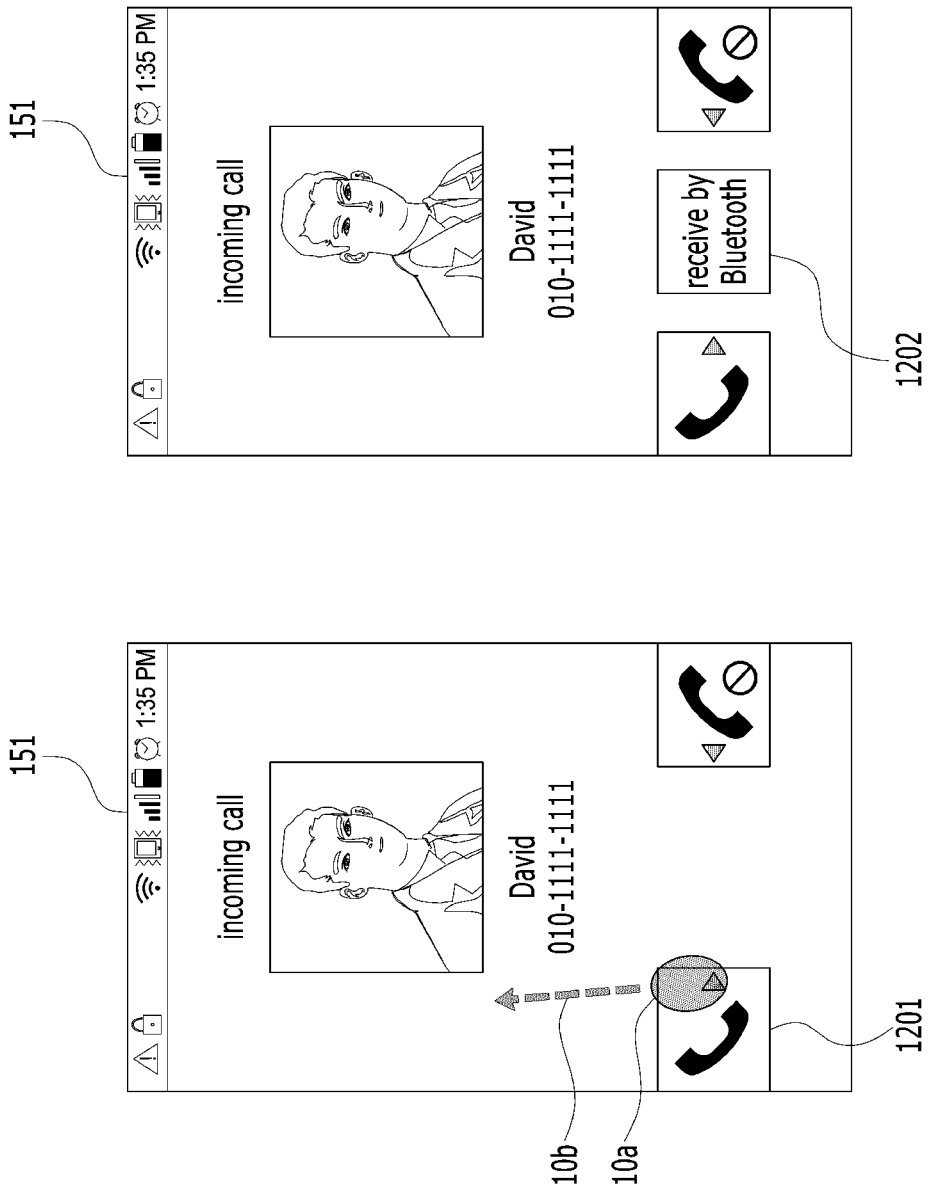

MOBILE TERMINAL THAT SWITCHES AUDIO PATHS BASED ON DETECTED MOVEMENT OF THE TERMINAL

CROSS REFERENCE TO RELATED APPLICATIONS

Pursuant to 35 U.S.C. § 119(a), this application claims the benefit of earlier filing date and right of priority to Korean Application No. 10-2014-0062536, filed on May 23, 2014, the contents of which are hereby incorporated by reference herein in their entirety.

BACKGROUND OF THE INVENTION

Field of the Invention

The present invention relates to a mobile terminal enabling a user to more conveniently use the terminal and a method of controlling therefor.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, an assistant terminal capable of assisting a function of a mobile terminal using such a near field communication as Bluetooth and the like is developing. As an example of the assistant terminal, there exists a type of easily being worn on a body of a user and the type can assist such an audio output function as music playback, telephone call and the like via a separately installed output unit. As a different example, there exists a type of being connected with an audio system mounted on a vehicle. Similarly, this type can assist the aforementioned audio output functions as well. Hence, it is required to have a method of efficiently controlling a mobile terminal and/or an assistant terminal in case that the assistant terminal configured to assist an audio output function of the mobile terminal is connected with the mobile terminal.

SUMMARY OF THE INVENTION

Accordingly, one object of the present invention is to solve the aforementioned problem and a different problem. Another object of the present invention is to provide a mobile terminal efficiently controlling the mobile terminal in a state that an external terminal configured to assist audio output is connected with the mobile terminal and a method of controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a wireless communication unit configured to communicate with the external terminal, a sensing unit configured to detect a movement of the mobile terminal, an audio output unit and a controller, if a first movement is detected by the sensing unit in the middle of receiving an incoming call in a first configuration state of which an audio output is performed via a first external terminal, configured to accept the incoming call and switch to a second configuration outputting an calling signal for the accepted incoming call via the audio output unit instead of the first external terminal.

To further achieve these objects and other advantages and in accordance with the purpose of the invention, as embodied and broadly described herein, according to a different embodiment, a method of controlling a mobile terminal includes the steps of detecting a movement of the mobile terminal by a sensing unit, if a first movement is detected by the sensing unit in the middle of receiving an incoming call in a first configuration state of which an audio output is performed via a first external terminal, accepting the incoming call and switching to a second configuration outputting an calling signal for the accepted incoming call via the audio output unit instead of the first external terminal.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 4A and 4B are conceptual diagrams for a method of controlling a sound path to be switched according to one embodiment of the present invention;

FIGS. 5A and 5B are diagrams for a method of controlling a sound path to be returned to a legacy sound path when a telephone call terminates according to one embodiment of the present invention;

FIGS. 6A and 6B are conceptual diagrams for a method of controlling a sound path to be switched when an assistant terminal is not worn according to one embodiment of the present invention;

FIGS. 7A and 7B are conceptual diagrams for a method of controlling a sound path to be switched in the middle of playing music via an assistant terminal according to one embodiment of the present invention;

FIGS. 10A, 10B and 10C are diagrams for a method of controlling a sound path when an incoming call is rejected according to one embodiment of the present invention;

FIGS. 12A and 12B are diagrams for explaining an example of a user input used for switching a sound path according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
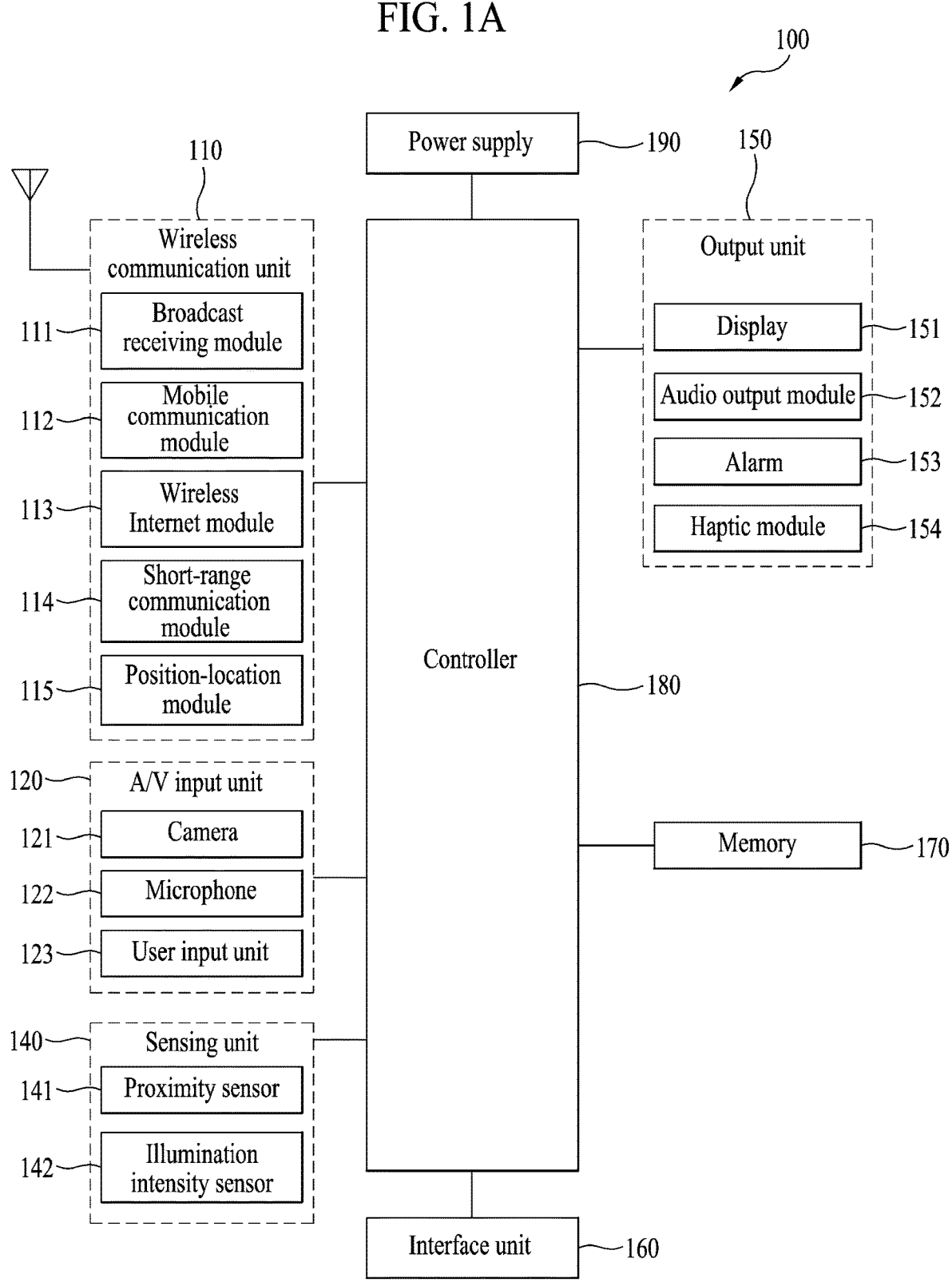
FIG. 1A is a block diagram of a mobile terminal in accordance with the present disclosure.
Figure 1B:
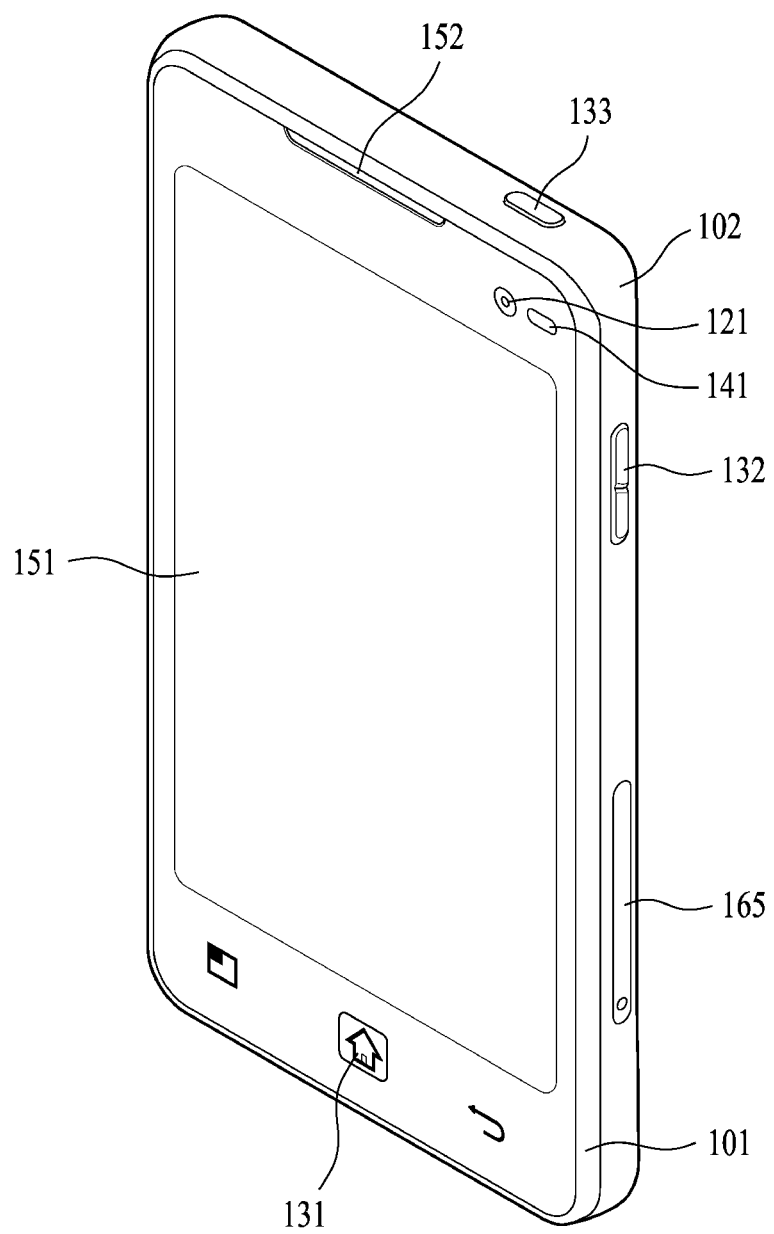
FIGS. 1B and 1C are conceptual views of one example of the mobile terminal, viewed from different directions.
Figure 1C:
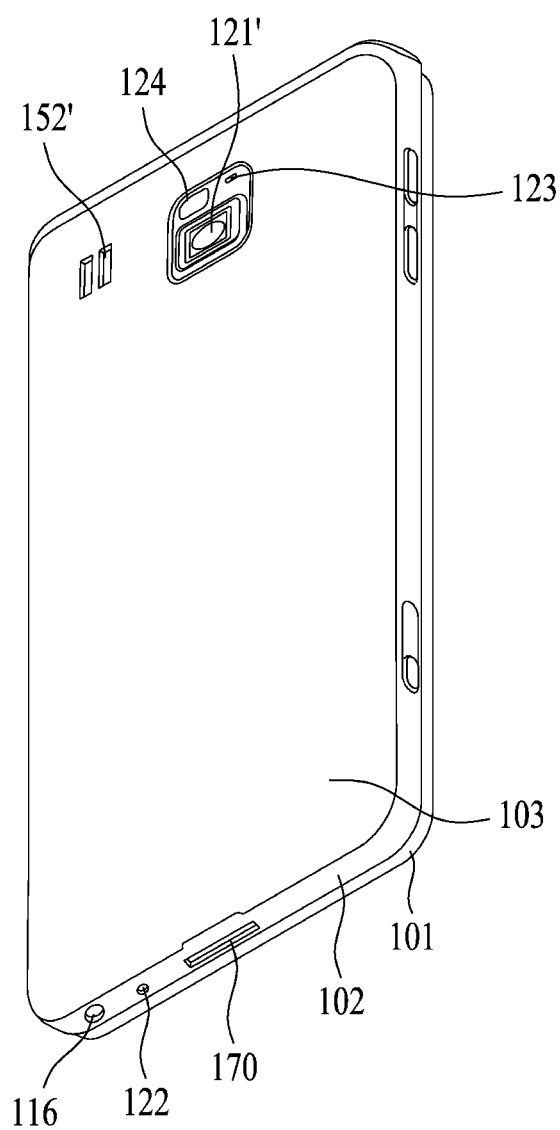

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Meanwhile, although a mobile terminal is mainly used by a hand of a user in a manner of being carried by the hand, the mobile terminal can be extended to a wearable device capable of being worn on a body of the user. Examples of the wearable device include a smart watch, a smart glass, a HMD (head mounted display) and the like. In the following, examples of the mobile terminal, which has extended to the wearable device, are explained.

A wearable device can exchange (or interwork) data with a different mobile terminal 100. A short-range communication module 114 can detect (or recognize) a neighboring wearable device capable of communicating with the mobile terminal 100. Moreover, if the detected wearable device corresponds to a device authenticated to communicate with the mobile terminal 100, a controller 180 can transmit at least a part of data processed in the mobile terminal 100 to the wearable device via the short-range communication module 114. Hence, a user can use the data processed in the mobile terminal 100 via the wearable device. For instance, when a telephone call is received on the mobile terminal 100, the telephone call can be performed using the wearable device. Or, when a text message is received on the mobile terminal 100, the received message can be checked using the wearable device.

In the following, control methods capable of being implemented on the mobile terminal and related embodiments are explained with reference to attached drawings. It will be apparent to those skilled in the art that the present invention can be specified into other form(s) without departing from the spirit or scope of the inventions.

Figure 2:
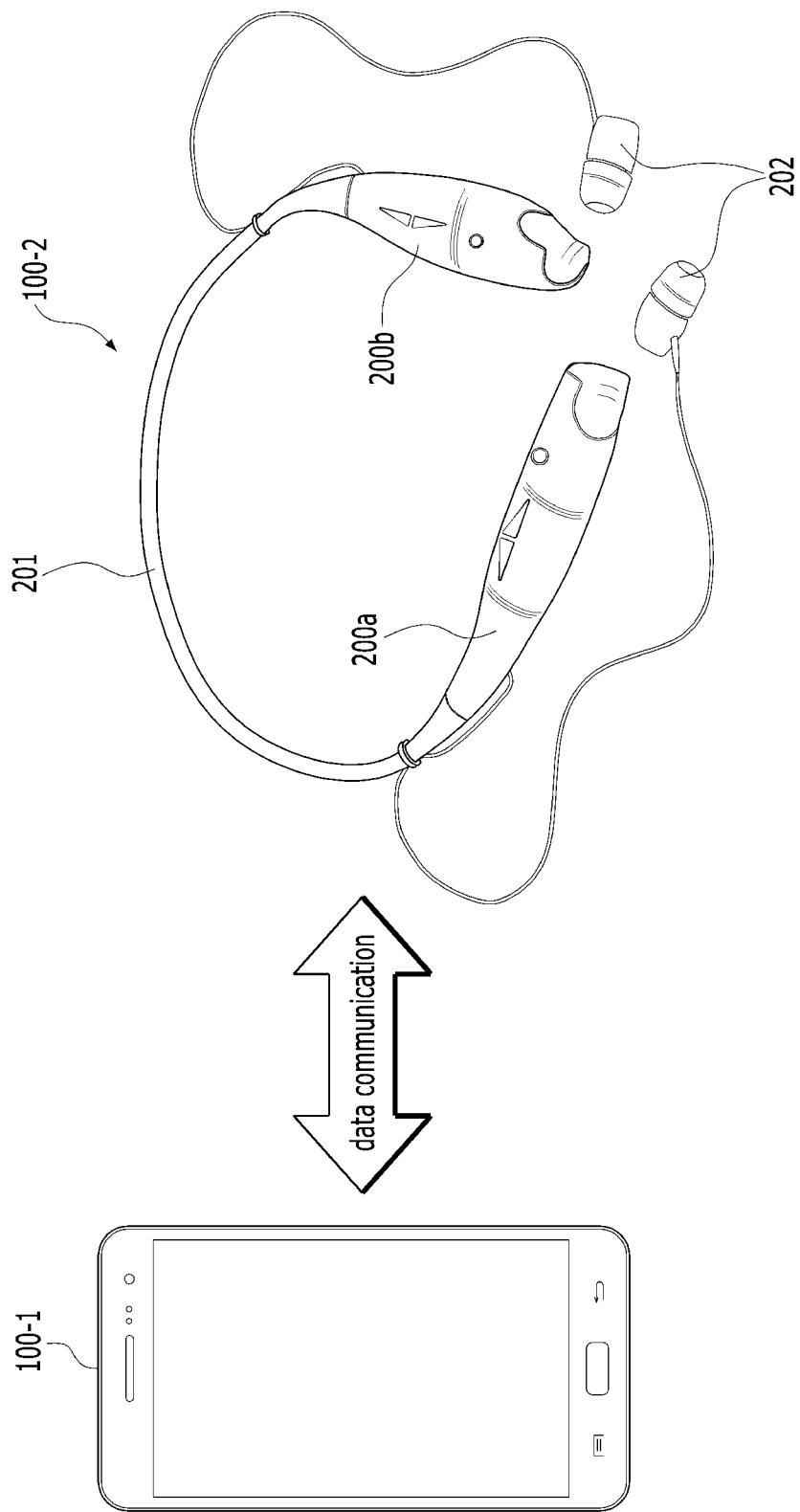
FIG. 2 is a diagram for an example of a mobile terminal 100-1 and an assistant terminal 100-2 according to one embodiment of the present invention.

FIG. 2 is a diagram for an example of a mobile terminal 100-1 and an assistant terminal 100-2 according to one embodiment of the present invention.

In the example shown in FIG. 2, the assistant terminal 100-2 has a form of a headset and can perform data communication in a manner of being connected with the mobile terminal 100-1. In particular, the mobile terminal 100-1 can transceive data with a wireless communication unit (not depicted) installed in the assistant terminal 100-2 in a manner of controlling a wireless communication unit 110.

With the help of the data communication, music playing in the mobile terminal 100-1 can be outputted via the assistant terminal 100-2 of the headset form. And, when a phone call is made using the mobile terminal 100-1, a calling signal can be outputted via the assistant terminal 100-2.

Embodiments of the present invention can be applied to not only the aforementioned two examples but also various audio signals.

When the mobile terminal 100-1 outputs an audio signal via an output unit 150 mounted on the mobile terminal, the controller 180 delivers the audio signal to the output unit 150 and can control the output unit 150 to output the delivered audio signal. In the following, a path on which the audio signal is delivered is called a first sound path.

On the contrary, in order to output an audio signal (music playback, a calling signal, and the like) of the mobile terminal 100-1 via the assistant terminal 100-2, the audio signal can be transmitted to the assistant terminal 100-2 by controlling the wireless communication unit 110. In the following, a path on which the audio signal is delivered is called a second sound path.

Data communication between the two terminals may correspond to near field communication, by which the present invention may be non-limited.

The assistant terminal 100-2 can include a frame 201 for wearing the assistant terminal on a neck of a user, a first main body 200a and a second main body 200b connected to both ends of the frame 201. And, the assistant terminal can further include earphones 202 electronically connected to each of the first and the second main body 200a/200b and capable of outputting an audio signal.

The present invention proposes a method of controlling the controller 180 to adaptively switch a sound path between the first sound path and the second sound path in accordance with surrounding environment according to one embodiment of the present invention. Regarding a detail embodiment, it shall be described with reference to drawings in the following.

Figure 3:
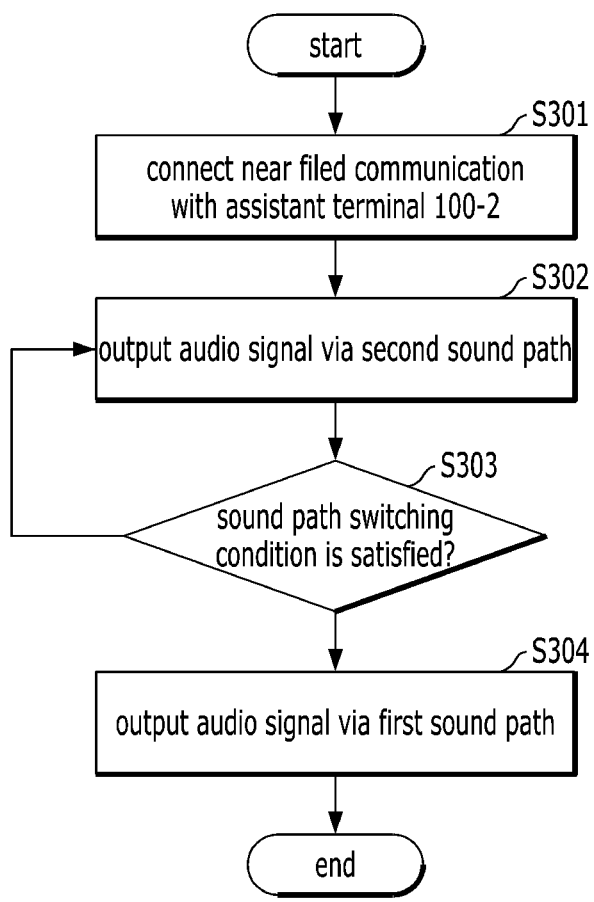
FIG. 3 is a flowchart for a method of controlling a sound path to be switched according to one embodiment of the present invention.

FIG. 3 is a flowchart for a method of controlling a sound path to be switched according to one embodiment of the present invention. FIGS. 4A and 4B are conceptual diagrams for a method of controlling a sound path to be switched according to one embodiment of the present invention. In the following, it shall be described with reference to FIG. 3 to FIG. 4B together.

In the step S301, the controller 180 can connect the assistant terminal 100-2 with near field communication via the wireless communication unit 110. In this case, if the near field communication is connected, terminals connected via the near field communication can identify with each other and can directly transceive data with each other. For instance, in case of near field communication using Bluetooth communication, connection of the near field communication can be called as pairing.

According to one embodiment of the present invention, if near field communication is connected with the assistant terminal 100-2, the controller 180 controls a second sound path to be selected. As mentioned in the foregoing description, the second sound path indicates a path configured to output an audio signal using the assistant terminal 100-2. This is because, if a user establishes a connection with the assistant terminal 100-2, it may indicate that the user has intention to use the assistant terminal 100-2. Hence, in the step S302, the controller 180 outputs an audio signal via the second sound path.

In the step S303, the controller 180 determines whether a sound path switching condition is satisfied. In this case, the sound path switching condition corresponds to a condition on at least one or more signals detected by a sensing unit 140 of the mobile terminal 100-1 which is detected to determine whether a user has intention of switching a sound path.

Embodiment explained with reference to FIGS. 4A and 4B corresponds to a first example of the sound path switching condition. The first example of the sound path switching condition corresponds to detection of an operation of bringing the mobile terminal 100-1 to an ear. This is because, if a phone call is received in middle of outputting (or if near field communication is connected although an audio signal is not outputted) an audio signal via a second sound path and the operation of bringing the mobile terminal 100-1 to an ear is detected, it may be determined as a user intends to receive the phone call via the mobile terminal 100-1 instead of the assistant terminal 100-2 outputting the audio signal.

According to an example shown in FIG. 4A, although a user is wearing the assistant terminal 100-2, music is not outputted via the assistant terminal 100-2. Yet, assume that near field communication is connected between the mobile terminal 100-1 and the assistant terminal 100-2. In particular, assume that the controller 180 is able to output an audio signal via the second sound path.

If an incoming call is received, the controller 180 can output notification of the incoming call via the mobile terminal 100-1 and/or an output unit of the assistant terminal 100-2.

According to one embodiment of the present invention, if an operation of brining the mobile terminal 100-1 to an ear is detected, the controller 180 can receive a phone call. Moreover, in case of outputting a calling signal of the received phone call, the controller 180 can output the calling signal via the output unit 150 of the mobile terminal 100-1 by switching a sound path from the second sound path to the first sound path [S304]. As mentioned in the foregoing description, this is because the operation of brining the mobile terminal 100-1 to an ear can be determined as an intention of receiving the phone call using the mobile terminal 100-1.

According to a different embodiment of the present invention, if an operation of brining the mobile terminal 100-1 to an ear is detected within a prescribed time after a phone call acceptance command is received in response to the notification of the incoming call, the operation can be used as a sound path switching condition. More specifically, if the controller 180 detects the operation of brining the mobile terminal 100-1 to an ear within a prescribed time after a user selects a call button, the controller 180 can control a sound path to be switched.

If a user makes a call as shown in FIG. 4B and terminates the call, it is required to return to an original sound path again. This condition corresponds to a second example of the sound path switching condition. In particular, this condition corresponds to a call termination condition of the mobile terminal 100-1. Regarding the second example, it shall be described with reference to FIGS. 5A and 5B in the following.

FIGS. 5A and 5B are diagrams for a method of controlling a sound path to be returned to a legacy sound path when a telephone call terminates according to one embodiment of the present invention.

Referring to FIG. 5A, similar to FIG. 4B, a user is making a call using the mobile terminal 100-1. If termination of the call (the second example of the sound path switching condition) is detected, the controller 180 can switch a sound path from the first sound path to the second sound path.

If the mobile terminal 100-1 was playing music using the second sound path before an incoming signal is received, the mobile terminal 100-1 can automatically play the music, which is paused due to the call, when the sound path is returned to the second sound path.

Meanwhile, although a situation of the embodiment explained with reference to FIGS. 4A and 4B corresponds to a situation that a user is wearing an assistant terminal, the present invention can also be identically applied to a situation that a user is not wearing the assistant terminal Regarding this, it shall be described with reference to FIGS. 6A and 6B in the following.

FIGS. 6A and 6B are conceptuals diagram for a method of controlling a sound path to be switched when an assistant terminal is not worn according to one embodiment of the present invention.

According to an example shown in FIG. 6A, a user is not wearing the assistant terminal 100-2 and music is not outputted via the assistant terminal 100-2. Similarly, assume that near field communication is connected between the mobile terminal 100-1 and the assistant terminal 100-2. In particular, assume that the controller 180 is able to output an audio signal via the second sound path.

If an incoming call is received, the controller 180 can output notification of the incoming call via the mobile terminal 100-1 and/or an output unit of the assistant terminal 100-2.

According to one embodiment of the present invention, if an operation of brining the mobile terminal 100-1 to an ear is detected, the controller 180 can receive a phone call. Moreover, in case of outputting a calling signal of the received phone call, the controller 180 can output the calling signal via the output unit 150 of the mobile terminal 100-1 by switching a sound path from the second sound path to the first sound path [S304]. As mentioned in the foregoing description, this is because the operation of brining the mobile terminal 100-1 to an ear can be determined as an intention of receiving the phone call using the mobile terminal 100-1.

Meanwhile, a different embodiment of the present invention proposes to further detect whether the assistant terminal 100-2 is worn and switch a sound path according to whether the assistant terminal is worn.

As shown in FIG. 4A, if a user is wearing the assistant terminal 100-2, the controller 180 detects the assistant terminal worn on the user and may be then able to output an audio signal via the assistant terminal 100-2 (second sound path) worn on the user. In this case, if the controller detects release of the wearing of the assistant terminal 100-2, the controller 180 can output the audio signal using an output unit (first sound path) mounted on the mobile terminal 100-1 instead of the assistant terminal 100-2 taken off from the user.

The embodiments mentioned earlier in FIG. 4A to FIG. 6B have explained a case that an incoming signal is received while music is not played via the assistant terminal 100-2. An incoming call might be received while music is playing. One embodiment of the present invention can also be applied to the aforementioned case. Regarding this, it shall be described with reference to FIG. 7.

FIGS. 7A and 7B are conceptual diagrams for a method of controlling a sound path to be switched in the middle of playing music via an assistant terminal according to one embodiment of the present invention.

According to an example shown in FIG. 7A, a near field communication is connected between the mobile terminal 100-1 and the assistant terminal 100-2. A user is wearing the assistant terminal 100-2 and the user is listening music outputted from the assistant terminal 100-2 worn on the user. In particular, assume that the controller 180 is able to output an audio signal via the second sound path.

If an incoming call is received, the controller 180 can output notification of the incoming call via the mobile terminal 100-1 and/or an output unit of the assistant terminal 100-2.

According to one embodiment of the present invention, if an operation of brining the mobile terminal 100-1 to an ear is detected, the controller 180 can receive a phone call. Moreover, in case of outputting a calling signal of the received phone call, the controller 180 can output the calling signal via the output unit 150 of the mobile terminal 100-1 by switching a sound path from the second sound path to the first sound path [S304].

As mentioned in the foregoing description, if the phone call is terminated, the controller 180 can control the sound path to be returned to the first sound path which is an original sound path and the music, which is paused due to the phone call, to be automatically played again. In particular, if there exists content originally played, the controller 180 can control the content to be played again.

In the foregoing description, a case that a single assistant terminal 100-2 is connected with the mobile terminal 100-1 is explained. Yet, a plurality of assistant terminals 100-2 can be connected with the mobile terminal irrespective of the number of the assistant terminals. In the following, a case of connecting a plurality of assistant terminals 100-2 with the mobile terminal is explained with reference to FIGS. 8A, 8B, 9A and 9B.

FIGS. 8A, 8B, 9A and 9B are diagrams for a method of controlling a sound path to be determined when a first assistant terminal 100-2 and a second assistant terminal 100-3 are connected with a mobile terminal 100-1 according to one embodiment of the present invention.

In an example shown in FIGS. 8A, 8B, 9A and 9B, assume that the mobile terminal 100-1 is connected with a first assistant terminal 100-2 and a second assistant terminal 100-3. A vehicle audio device is shown in FIGS. 8A, 8B, 9A and 9B as an example of the second assistant terminal 100-3. A sound path configured to output an audio signal via the vehicle audio device is called a third sound path in the following.

Figure 8B:
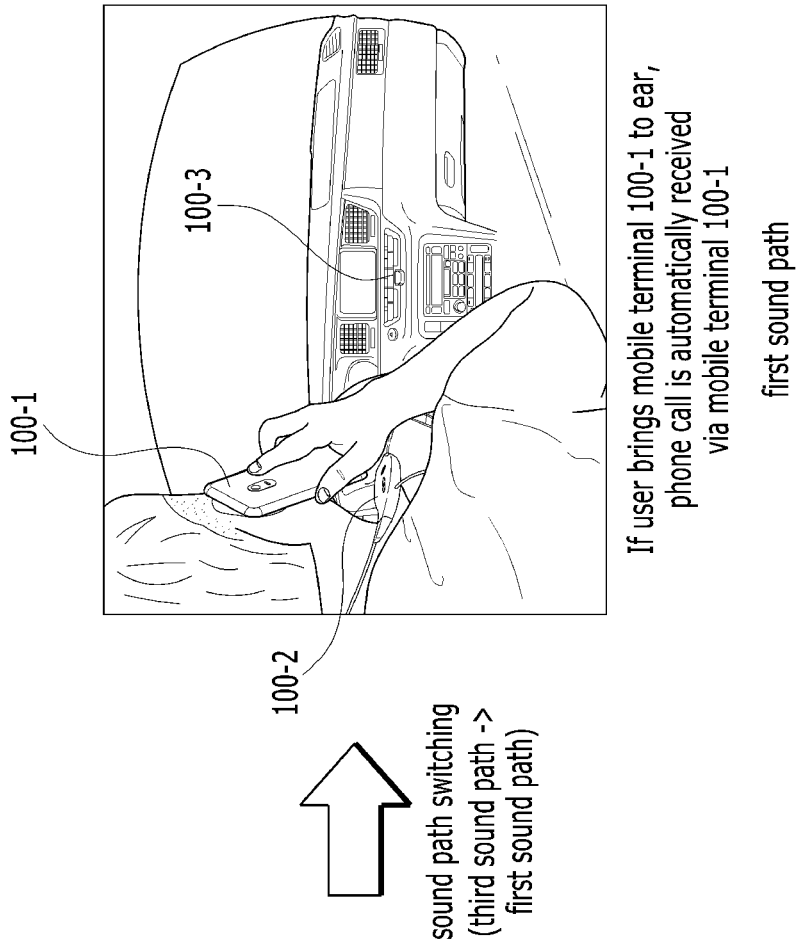
FIGS. 8A, 8B, 9A and 9B are diagrams for a method of controlling a sound path to be determined when a first assistant terminal 100-2 and a second assistant terminal 100-3 are connected with a mobile terminal 100-1 according to one embodiment of the present invention.
Figure 8A:
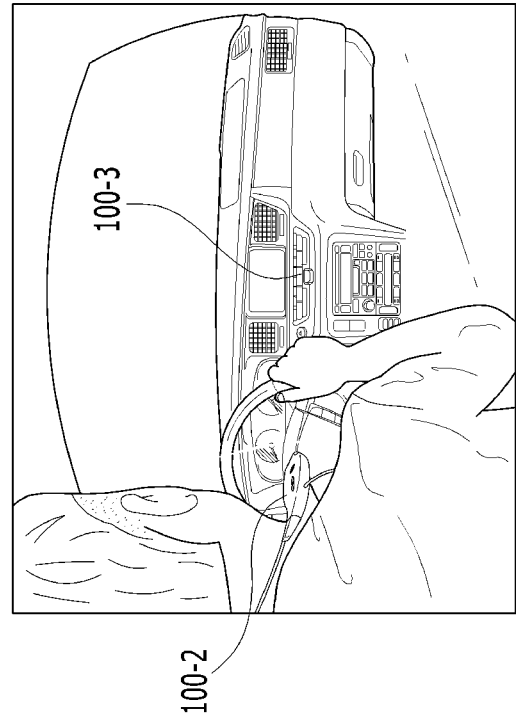

As shown in FIG. 8A, if an incoming call is received in a state that the first and the second assistant terminal 1001-2/100-3 are connected with each other, the controller 180 can output notification of the incoming call using at least one selected from the group consisting of the first sound path, the second sound path and the third sound path.

If an operation of brining the mobile terminal 100-1 to an ear is detected, the controller 180 can receive the phone call. Moreover, in case of outputting a calling signal of the received phone call, the controller 180 can output the calling signal via the output unit 150 of the mobile terminal 100-1 by switching a sound path from the third sound path to the first sound path.

Figures 9A, 9B:
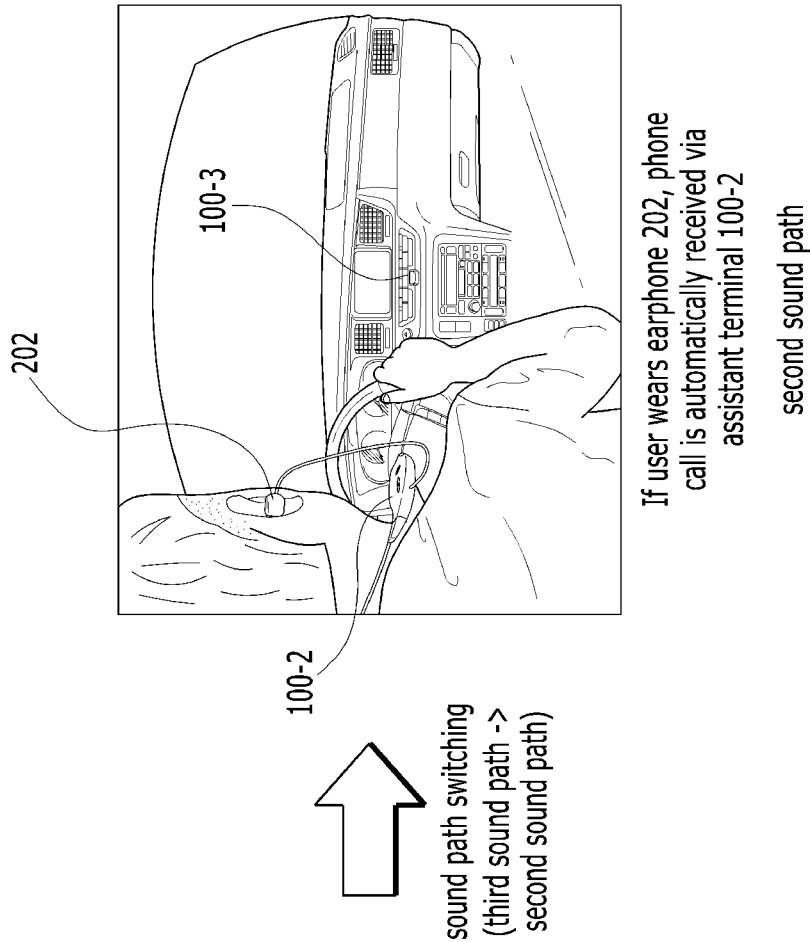

Referring to FIG. 9A, the controller 180 can output notification of an incoming call in a state identical to the state of FIG. 8A.

Subsequently, if wearing of an earphone 202 mounted on the first assistant terminal 100-2 is detected, the controller 180 can receive a phone call. Moreover, in case of outputting a calling signal of the received phone call, the controller 180 can output the calling signal via the output unit 150 of the first assistant terminal 100-2 by switching a sound path from the third sound path to the second sound path.

In particular, the aforementioned embodiment proposes to select a sound path configured to output audio via a specific assistant terminal by detecting an intention of a user intending to receive a phone call via the specific assistant terminal although a plurality of assistant terminals are connected to the mobile terminal.

Meanwhile, although embodiment of accepting an incoming call is explained in the aforementioned embodiment, embodiment of rejecting an incoming call is also possible. Regarding this, it shall be explained with reference to FIGS. 10A to 10C in the following.

FIGS. 10A, 10B and 10C are diagrams for a method of controlling a sound path when an incoming call is rejected according to one embodiment of the present invention.

According to an example shown in FIG. 10A, a user is wearing the assistant terminal 100-2 and the user is listening music outputted from the assistant terminal 100-2 worn on the user. In particular, assume that the controller 180 is able to output an audio signal via the second sound path.

If an incoming call is received, the controller 180 can output notification of the incoming call via the mobile terminal 100-1 and/or an output unit of the assistant terminal 100-2. As shown in FIG. 10B, a user can check the notification of the incoming call. When the user intends to reject (or postpone) the incoming call due to a situation incapable of receiving a phone call or other reason, the user can reject the incoming call. According to one embodiment of the present invention, if a reception rejection condition is satisfied, a previous sound path is maintained as it is and music can be continuously outputted (refer to FIG. 10C). Moreover, if the reception rejection condition is satisfied, the controller 180 does not output the notification of the incoming call anymore and can return to continuously output the music.

The reception rejection condition corresponds to a condition used for determining whether a user has an intention of rejecting an incoming call. Examples of the reception rejection condition may include (1) detecting a return to an original state or (2) detecting an operation of putting the mobile terminal into a pocket (or a bag etc.) of the user after the user checks reception of an incoming call.

The return to the original state indicates a return to a state of which the incoming call is not received yet. For instance, when it is detected that the mobile terminal is put on a flat floor before an incoming signal is received, if the mobile terminal is put on the flat floor again after notification of the incoming call is checked, it may correspond to a case that the mobile terminal returns to the original state. In particular, the state may correspond to environment of the mobile terminal 100-1 capable of being determined based on a sensed result detected by various sensing units 140 of the mobile terminal 100-1.

A height of the mobile terminal 100-1 might be a different example of the return to the original state. If an acceleration sensor is used, a rough height change of the mobile terminal 100-1 can be identified. In particular, if a user lifts up the mobile terminal 100-1 to check an incoming call, the height of the mobile terminal 100-1 may increase in a moment (i.e., detect acceleration against direction gravity). In this case, if the height of the mobile terminal 100-1 decreases again, it is determined as an intention of rejecting the incoming call. If the height of the mobile terminal increases after the incoming call is checked, it can be determined as an intention of accepting the incoming call. This is because the mobile terminal 100-1 should be brought to a position near a face of the user to make a call.

Moreover, if it is determined that the mobile terminal 100-1 is positioned at a pocket of the user using various sensed results detected by the sensing unit 140 of the mobile terminal 100-1, it can be determined as an intention of rejecting the incoming call by the controller 180. A sensor detecting the mobile terminal positioned at the pocket of the user may include at least one selected from the group consisting of an acceleration sensor, an illumination sensor and a proximity sensor. If a change detected by the acceleration sensor shows a pattern similar to a step of a person, the controller 180 can determine it as the mobile terminal is positioned at the pocket. Or, if brightness detected by the illumination sensor becomes dark in a moment, it can be determined as the mobile terminal is positioned at the pocket. Or, if a signal detected by the proximity sensor shows proximity, the controller 180 can determine it as the mobile terminal is positioned at the pocket.

Meanwhile, if a sound path switching condition is satisfied in the middle of making a call using the mobile terminal 100-1, a method of controlling using the assistant terminal 100-2 is explained with reference to FIGS. 11A to 11C in the following.

Figure 11A:
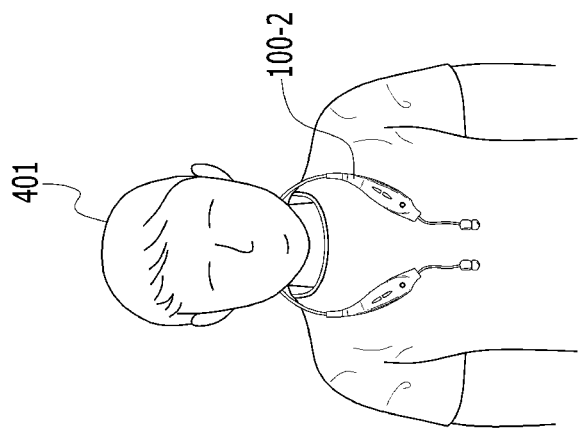
FIGS. 11A, 11B and 11C are diagrams for a method of controlling a telephone call to be switched to an assistant terminal 100-2 in the middle of calling using a mobile terminal 100-1 according to one embodiment of the present invention.
Figure 11B:
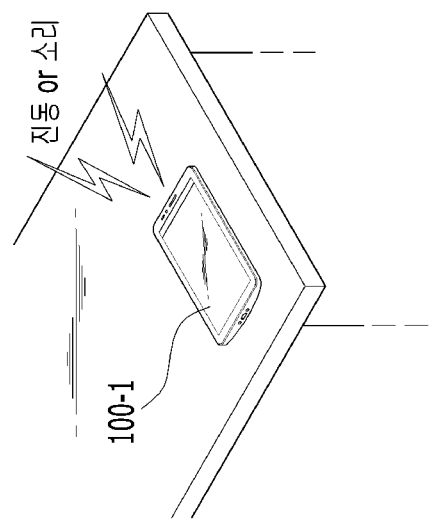
Figure 11C:
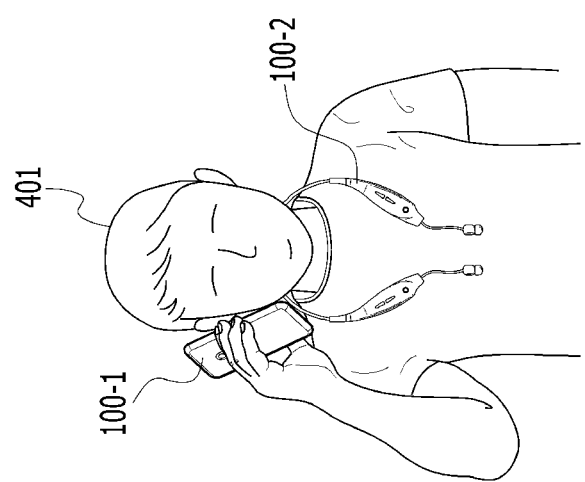

FIGS. 11A, 11B and 11C are diagrams for a method of controlling a telephone call to be switched to an assistant terminal 100-2 in the middle of calling using a mobile terminal 100-1 according to one embodiment of the present invention.

Referring to FIG. 11A, a user is making a phone call using the mobile terminal 100-1. The user performing the phone call using the mobile terminal 100-1 may intend to continuously make the phone call by switching to the assistant terminal 100-2. This is because, if the assistant terminal 100-2 has such a form as a headset capable of being worn on the user, it is more convenient for the user to make the phone call compared to the mobile terminal 100-1.

In the example shown in FIG. 11, a sound path switching condition corresponds to a condition that detects a flat floor using the mobile terminal 100-1. In general, this is because, if the mobile terminal is put on the flat floor in the middle of making a phone call using the mobile terminal 100-1, it is determined as a user intends to make the phone call using a different method. Moreover, the sound path switching condition may correspond to a condition of detecting the flat floor via the mobile terminal 100-1 and wearing of the assistant terminal 100-2. This is because a phone call using the assistant terminal is available only when the assistant terminal 100-2 is worn on a user.

If a sound path switching condition is satisfied, the controller 180 can switch a sound path from the first sound path to the first sound path. In particular, the controller 180 can output a calling signal via the assistant terminal 100-2 in a manner of switching the calling signal to the assistant terminal. Moreover, in order to inform a user of the switched sound path, the controller 180 can control the haptic module 153 to vibrate. Or, the controller 180 can control the output unit 140 to output guide voice. The output of the vibration and the guide voice can be outputted via not only the mobile terminal 100-1 but also the assistant terminal 100-2.

Meanwhile, according to the aforementioned embodiment, a sound path is switched by the controller 180. Meanwhile, it is apparent that the sound path can be switched by an input of a user. Regarding this, it shall be described with reference to FIGS. 12A and 12B in the following.

FIGS. 12A and 12B are diagrams for explaining an example of a user input used for switching a sound path according to one embodiment of the present invention.

Each of FIG. 12A and FIG. 12B shows a state of informing that an incoming call outputted via a touch screen 151 is received. If a first touch gesture is received on a call acceptance button 1201, the controller 180 can output (first sound path) a calling signal via an output unit of the mobile terminal 100-1. If a second touch gesture is received on the call acceptance button 1201, the controller 180 can output (second sound path) a calling signal via the assistant terminal 100-2. Of course, assume that the assistant terminal 100-2 is connected with the mobile terminal 100-1.

As shown in FIG. 12A, as an example, the second gesture may correspond to an input touching 10*a* the call acceptance button 1201 and dragging 10*b* the input while the touch is maintained. In this case, color of the input may vary according to a direction of the dragging to inform a user of inputs different from each other.

Or, as shown in FIG. 12B, if a touch input selecting a prescribed button 1202 distinguished from the call acceptance button 1201 is received, the controller 180 can output (second sound path) a calling signal via the assistant terminal 100-2. In particular, a button configured to make a phone call using the assistant terminal 100-2 can be separately configured.

In the aforementioned embodiment, an operation of bringing the mobile terminal 100-1 to an ear is detected. In the following, a method of detecting the operation is explained in detail.

As mentioned earlier with reference to FIG. 1*b*, a proximity sensor 141 is installed in the exterior of a front side of the mobile terminal 100-1. The proximity sensor 141 can be installed in the vicinity of a first audio output module 152*a*. Since a calling signal is outputted via the first audio output module 152*a*, a user may bring an ear of the user to the first audio output module 152*a* to make a call. In doing so, a value of a signal detected by the proximity sensor 141 may change.

In order to bring the mobile terminal to an ear, a user may perform an operation of lifting up the mobile terminal 100-1. If an acceleration change, a direction of gravity change, an inclination change or the like of the mobile terminal 100-1 detected by the sensing unit 140 is greater than a prescribed value, the controller 180 can detect the operation of lifting up the mobile terminal 100-1.

Hence, if the operation of lifting up the mobile terminal 100-1 is detected and approaching of a body of a user is detected by the proximity sensor 141, the controller 180 can detect the operation of bringing the mobile terminal to an ear can be detected.

As mentioned in the foregoing description, in order to detect the operation of lifting up the mobile terminal 100-1, the acceleration change, the gravity direction change and/or the inclination change detected by the sensing unit 140 is required to be higher than a prescribed value. One embodiment of the present invention proposes to provide a progressive indicator indicating a degree of completion of an operation to a user. Regarding this embodiment, it shall be described with reference to FIG. 13 in the following.

Figure 13:
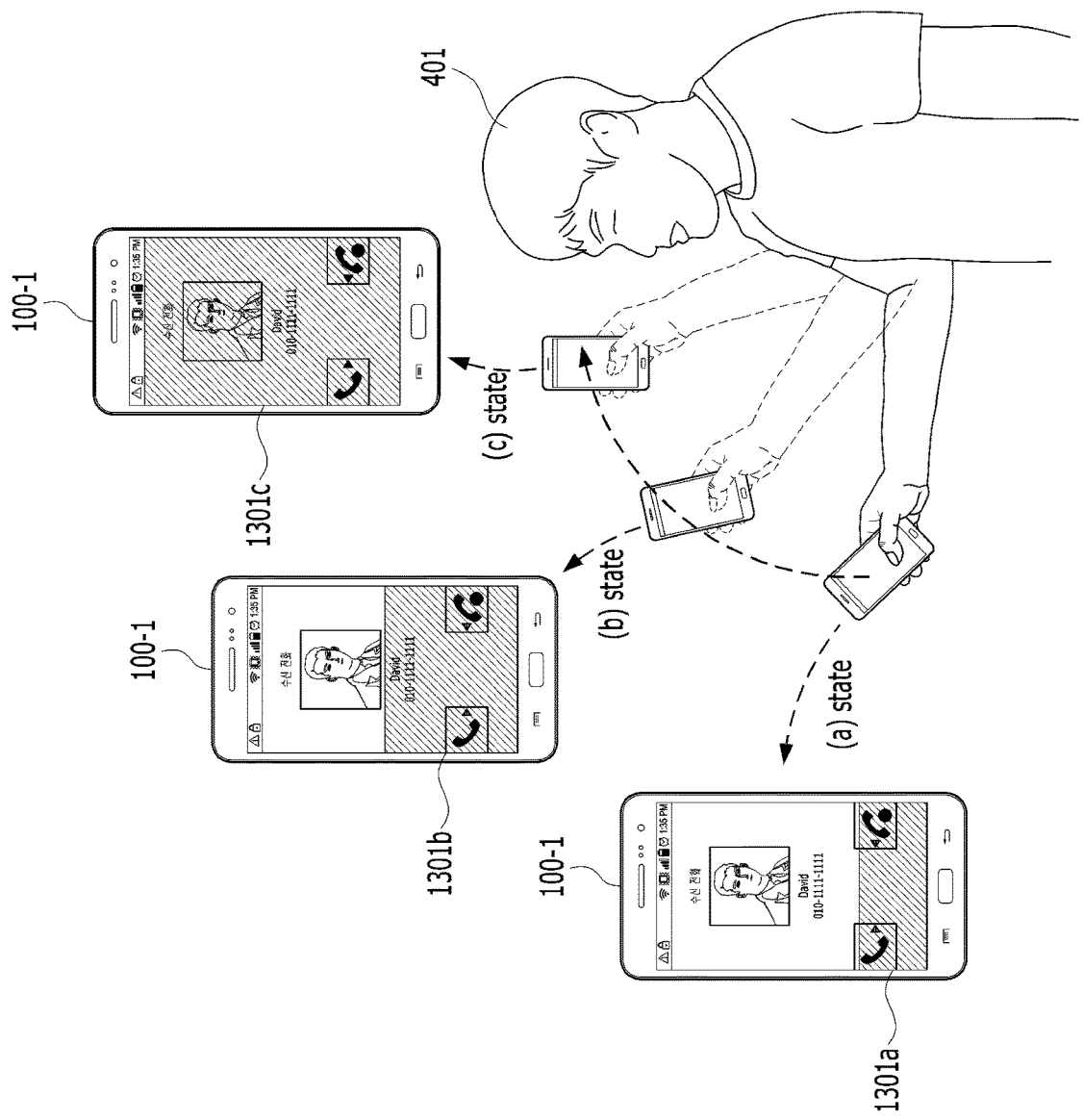
FIG. 13 is a diagram for an example of a progressive indicator indicating a degree of completion of an operation lifting a mobile terminal according to one embodiment of the present invention.

FIG. 13 is a diagram for an example of a progressive indicator indicating a degree of completion of an operation lifting a mobile terminal according to one embodiment of the present invention.

As mentioned in the foregoing description, one embodiment of the present invention detects an operation of lifting up the mobile terminal when a value change of acceleration, a value change of gravity and/or a value change of inclination is greater than a prescribed value. In particular, it is able to say that an operation is completed only when the change is arrived at the prescribed value. A user may require the degree of completion of the operation before the change is arrived at the prescribed value. This is because the user is able to determine further required change on the basis of the degree of completion of the operation.

In an example shown in FIG. 13, assume that (a), (b) and (c) have the degree of completion as much as 30%, 50% and 80%, respectively, on the basis of the completion of the operation of lifting up the mobile terminal.

The controller 180 can output a progressive indicator 1301*a* to 1301*c* indicating the degree of completion on the touch screen 151. According to one embodiment of the present invention, the progressive indicator 1301*a* to 1301*c* can show the degree of completion to a user. According to an example shown in FIG. 13, the progressive indicator 1310*a* outputted in (a) state is outputted to have a size of 30% of the touch screen 151. The size of the progressive indicator may become larger according to the degree of completion as the state is progressing from (b) state to (c) state.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a wireless communication unit configured to communicate with an external terminal;
   a sensing unit configured to detect movement of the mobile terminal;
   a touchscreen,
   an audio output unit; and
   a controller configured to:
   enable a first audio path for providing audio to the external terminal via the wireless communication unit;
   switch from the first audio path to a second audio path when the detected movement of the mobile terminal meets a first condition, wherein the switching enables the second audio path to provide audio to the audio output unit, and wherein the first condition comprises lifting up the mobile terminal;

further switch from the second audio path to the first audio path while the audio is being provided to the audio output unit via the second audio path, when the detected movement of the mobile terminal meets a second condition;

continuously provide, via the first audio path, the audio that have been provided via the second audio path to the external terminal; and cause the touchscreen to display an indicator indicating a degree of completion of the lifting up of the mobile terminal to permit determining of a remaining amount of the lifting up necessary to meet the first condition, wherein the indicator comprises a progress bar representing the degree of the completion of the lifting up as a length of a bar, wherein the controller is further configured to:

continue the providing of the audio to the external terminal via the first audio path and reject an incoming call, when the detected movement of the mobile terminal meets a third condition while the incoming call is being received at the mobile terminal, wherein the third condition comprises detecting a return to an original state prior to the receiving of the incoming call, and the return to the original state includes increasing a height of the mobile terminal and consecutively decreasing the height of the mobile terminal, and wherein the third condition further comprises detecting putting the mobile terminal in a pocket or a bag of a user based on the sensed movement of the mobile terminal similar to a walking pattern of the user or a sudden decrease of a sensed illuminance in surroundings of the mobile terminal.

2. The mobile terminal of claim 1, wherein the controller is further configured to:

pause content associated with the provided audio to the external terminal via the first audio path when the detected movement of the mobile terminal meets the first condition while an incoming call is being received at the mobile terminal.

3. The mobile terminal of claim 1, wherein the controller is further configured to:

cause the provided audio to the external terminal via the first audio path to be output at the external terminal at a relatively lower audio volume when an incoming call is being received at the mobile terminal and prior to the detected movement of the mobile terminal meeting the first condition.

4. The mobile terminal of claim 1, wherein the controller is further configured to:

terminate providing audio for an accepted call to the audio output unit while the accepted call is being received, and provide the audio for the accepted call to the external terminal via the first audio path, when the detected movement of the mobile terminal meets the second condition.

5. The mobile terminal of claim 1, wherein the second condition comprises placement of the mobile terminal on a surface.

6. The mobile terminal of claim 1, wherein the controller is further configured to:

determine that a second external terminal is physically coupled to a user's ear; and provide the audio to the second external terminal for a call.

7. The mobile terminal of claim 1, wherein the controller is further configured to:

perform the switch from the first audio path to the second audio path when the detected movement of the mobile terminal meets the first condition and while an incoming call is being received at the mobile terminal; and provide the audio to the audio output unit after the incoming call is accepted, wherein the audio that is provided to the audio output unit is for the accepted call.

8. A method of controlling a mobile terminal, the method comprising enabling a first audio path for providing audio to an external terminal via a wireless communication unit;

detecting movement of the mobile terminal;

switching from the first audio path to a second audio path when the detected movement of the mobile terminal meets a first condition, wherein the switching enables the second audio path to provide audio to an audio output unit of the mobile terminal, and wherein the first condition comprises lifting up the mobile terminal;

further switching from the second audio path to the first audio path while the audio is being provided to the audio output unit via the second audio path, when the detected movement of the mobile terminal meets a second condition;

continuously providing, via the first audio path, the audio that have been provided via the second audio path to the external terminal;

displaying on a touchscreen an indicator indicating a degree of completion of the lifting up of the mobile terminal to permit determining of a remaining amount of the lifting up necessary to meet the first condition, wherein the indicator comprises a progress bar representing the degree of the completion of the lifting up as a length of a bar; and continuing the providing of the audio to the external terminal via the first audio path and rejecting an incoming call, when the detected movement of the mobile terminal meets a third condition while the incoming call is being received at the mobile terminal, wherein the third condition comprises detecting a return to an original state prior to the receiving of the incoming call, and the return to the original state includes increasing a height of the mobile terminal and consecutively decreasing the height of the mobile terminal, and wherein the third condition further comprises detecting putting the mobile terminal in a pocket or a bag of a user based on the sensed movement of the mobile terminal similar to a walking pattern of the user or a sudden decrease of a sensed illuminance in surroundings of the mobile terminal.

9. The method of claim 8, further comprising:

pausing content associated with the provided audio to the external terminal via the first audio path when the detected movement of the mobile terminal meets the first condition while an incoming call is being received at the mobile terminal.

10. The method of claim 8, further comprising:

causing the provided audio to the external terminal via the first audio path to be output at the external terminal at a relatively lower audio volume when an incoming call is being received at the mobile terminal and prior to the detected movement of the mobile terminal meeting the first condition.

11. The method of claim 8, further comprising:

terminating providing audio for an accepted call to the audio output unit while the accepted call is being received, and providing the audio for the accepted call to the external terminal via the first audio path, when the detected movement of the mobile terminal meets the second condition.

12. The method of claim 8, wherein the second condition comprises placement of the mobile terminal on a surface.

13. The method of claim 8, further comprising:
determining that a second external terminal is physically coupled to a user's ear; and
providing the audio to the second external terminal for a call.

14. The method of claim 8, further comprising:
performing the switch from the first audio path to the second audio path when the detected movement of the mobile terminal meets the first condition and while an incoming call is being received at the mobile terminal; and
providing the audio to the audio output unit after the incoming call is accepted, wherein the audio that is provided to the audio output unit is for the accepted call.

\* \* \* \* \*